United States Patent

[11] 3,633,111

[72] Inventor Wayne A. Smith
Russiaville, Ind.
[21] Appl. No. 868,365
[22] Filed Oct. 22, 1969
[45] Patented Jan. 4, 1972
[73] Assignee General Motors Corporation
Detroit, Mich.

[54] SIGNAL-SEEKING RADIO RECEIVER
3 Claims, 7 Drawing Figs.

Figure 1:
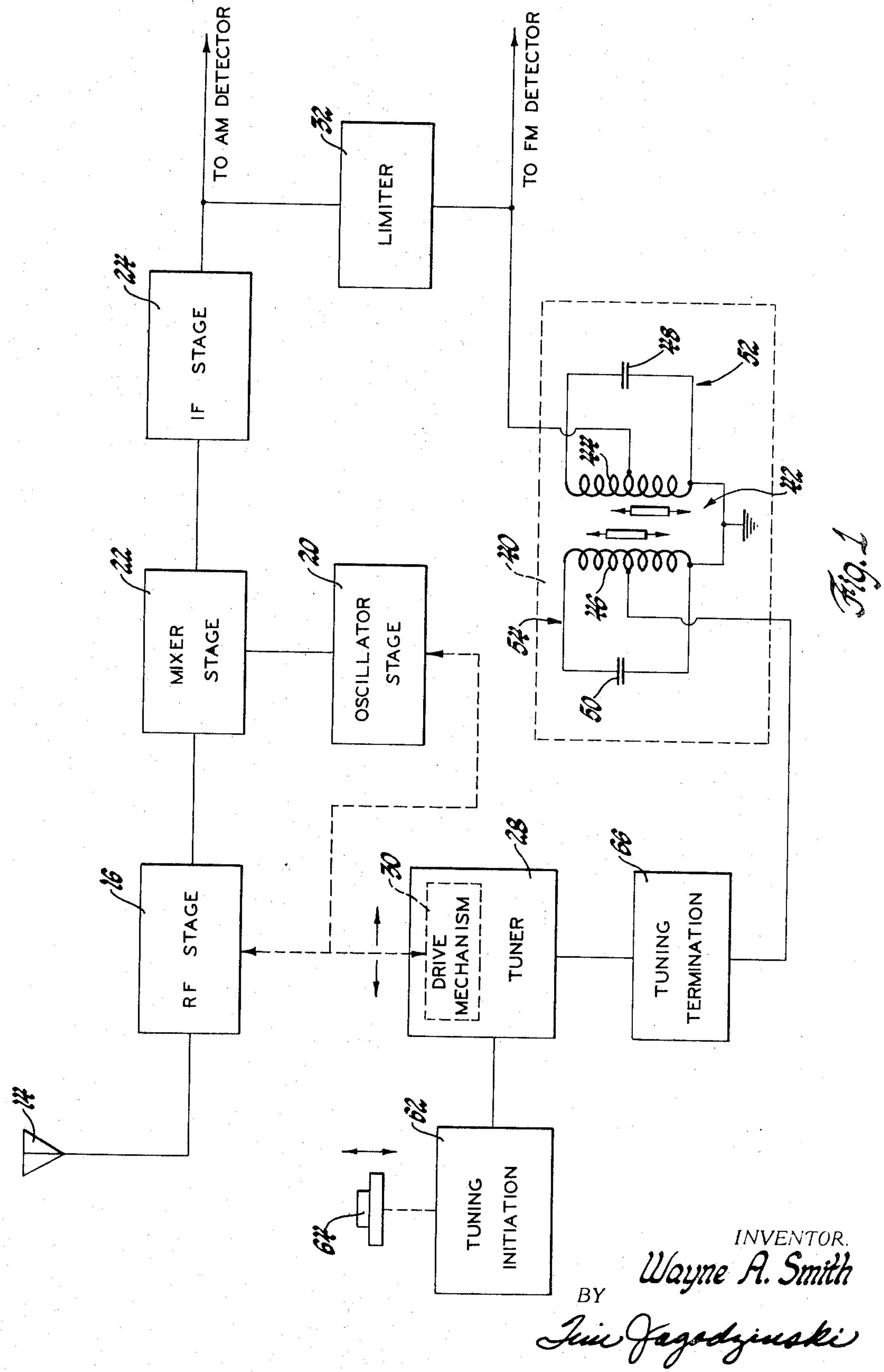

[52] U.S. Cl. ........ 325/470
[51] Int. Cl. ........ H04b 1/32
[50] Field of Search ........ 325/470, 471; 334/20

[56] References Cited
UNITED STATES PATENTS

| | | | |
|---|---|---|---|
| 3,131,370 | 4/1964 | Hahnel | 325/470 X |
| 3,456,197 | 7/1969 | Schulz | 325/470 X |

OTHER REFERENCES

Scott, Radio-Electronics pp. 80–83 May, 1966, Vol. 37 No. 5

*Primary Examiner*—Robert L. Richardson
*Attorneys*—E. W. Christen, C. R. Meland and Tim G. Jagodzinski ABSTRACT: A superheterodyne radio receiver is provided for receiving RF signals over a reception frequency spectrum. The radio receiver includes a signal-seeking tuner having a drive mechanism for defining the reception frequency of the radio receiver as a function of the movement of the drive mechanism. The tuner is responsive to a start signal to initiate movement of the drive mechanism to vary the reception frequency of the radio receiver over the reception frequency band. Further, the tuner is responsive to a stop signal to terminate movement of the drive mechanism after the drive mechanism has coasted to a stop over a stopping-frequency range. A control circuit includes a transformer having a primary tuned circuit and a secondary tuned circuit each exhibiting a slightly different resonant frequency. A limiter circuit combines with the control circuit to provide frequency response curves for the IF signal of the radio receiver which are compressed with respect to overall magnitude and skewed with respect to peak frequency. As a result, an IF control signal is developed having an amplitude which exceeds a trigger level only when the nominal magnitude of the received RF signal exceeds a minimum reception level, and only when the reception frequency of the radio receiver differs from the carrier frequency of the received RF signal by an amount approximately equal to the stopping frequency range of the tuner drive mechanism. A stop signal is applied to the tuner when the amplitude of the IF signal exceeds the trigger level so that the drive mechanism coasts to a stop at a frequency approximately equal to the carrier frequency of the next received RF signal having a nominal magnitude in excess of the minimum reception level.

INVENTOR.
Wayne A. Smith
BY
Tui Jagodzinski
ATTORNEY

INVENTOR.
Wayne A. Smith
BY
ATTORNEY

SIGNAL-SEEKING RADIO RECEIVER

This invention relates to a signal-seeking superheterodyne radio receiver. More particularly, the invention relates to a superheterodyne radio receiver having a signal-seeking tuner for tuning the reception frequency of the radio receiver to those RF signals over a reception frequency band having a nominal magnitude in excess of a minimum reception level.

A superheterodyne radio receiver exhibits a reception frequency which must be tuned to receive RF signals each having a different nominal amplitude and each having a different carrier frequency. Ordinarily, a signal-seeking superheterodyne radio receiver includes a tuner having a drive mechanism for defining the reception frequency of the radio receiver as a function of the movement of the drive mechanism. The tuner is responsive to the application of a start signal to initiate movement of the drive mechanism to vary the reception frequency of the radio receiver over a frequency spectrum. Further, the tuner is responsive to a stop signal to terminate movement of the drive mechanism after the drive mechanism has coasted to a stop over a stopping frequency range.

Accordingly, the following two requirements must be met in order to achieve optimum signal-seeking operation of a superheterodyne radio receiver. First, the stop signal must be applied to the tuner only when the nominal amplitude of the received RF signal exceeds a minimum reception level necessary to produce satisfactory reception results in the radio receiver. Second, the stop signal must be applied to the tuner only when the reception frequency of the radio receiver differs from the carrier frequency of the received RF signal by an amount approximately equal to the stopping frequency range of the drive mechanism. This invention proposes a signal-seeking superheterodyne radio receiver which fully meets these requirements.

In a conventional superheterodyne radio receiver, an IF signal is provided having a nominal amplitude proportional to the nominal amplitude of the received RF signal and having a carrier frequency proportional to the difference between the reception frequency of the radio receiver and the carrier frequency of the received RF signal. The present invention provides different IF response curves each corresponding to a different amplitude of the IF signal. The IF response curves are compressed as regards overall magnitude and are skewed as regards peak frequency. As a result, an IF control signal having a controlled amplitude is developed. A stop signal is applied to the tuner when the amplitude of IF control signal exceeds a trigger level.

According to one aspect of the invention, the amplitude of the IF control signal is constrained to exceed the trigger level only when the received RF signal exceeds the minimum reception level of the radio receiver. In general, this is accomplished as follows: A limiter circuit clips the amplitude of the IF signal at a limiting level to obtain an IF limited signal. The overall slope of the IF limited signal increases at a decreasing rate as the amplitude of the IF signal increases. A control circuit includes a transformer which develops the IF control signal in a secondary winding in response to application of the IF limited signal to a primary winding. The amplitude of the IF control signal is proportional to the slope of the IF limited signal so as to compress the IF response curves with respect to overall magnitude. Due to the compressed IF response curves, the amplitude of the IF control signal exceeds the trigger level only when the nominal amplitude of the IF signal corresponds to an RF signal having a nominal amplitude in excess of the minimum reception level of the radio receiver.

In another aspect of the invention, the amplitude of the IF control signal is constrained to exceed the trigger level only when the reception frequency of the radio receiver differs from the carrier frequency of the received RF signal by an amount approximately equal to the stopping frequency range of the tuner drive mechanism. Generally, this is accomplished as follows: The control circuit includes a pair of capacitors each connected across a different one of the primary and secondary windings of the transformer to form corresponding primary and secondary tuned circuits. The resonant frequencies of the primary and secondary tuned circuits are slightly different so as to skew the IF response curves with respect to peak frequency. Due to the compressed and skewed IF response curves, the amplitude of the IF control signal exceeds the trigger level only when the carrier frequency of the IF signal corresponds to an RF signal having a carrier frequency which differs from the reception frequency of the radio receiver by an amount approximately equal to the stopping frequency range of the tuner drive mechanism.

The invention may be best understood by reference to the following detailed description of a preferred embodiment when considered in conjunction with the accompanying drawing, in which:

FIG. 1 is a combined block and schematic diagram of a superheterodyne radio receiver incorporating the principles of the invention.

FIGS. 2, 3, 4, 5*a*, 5*b* and 6 are graphs of signal characteristics useful in explaining the principles of the invention.

Figure 2:
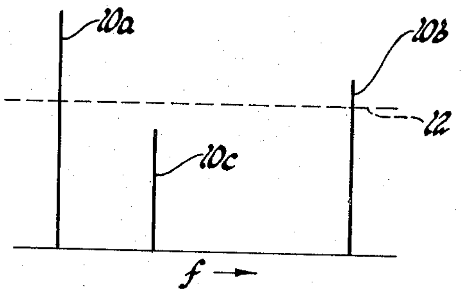

FIG. 1 discloses a signal-seeking superheterodyne radio receiver for receiving RF signals over a reception frequency spectrum. A portion of a typical reception frequency spectrum is shown in FIG. 2 where several RF signals $\mathbf{10}_a$, $\mathbf{10}_b$ and $\mathbf{10}_c$ are each represented by a vertical line. Regardless whether the RF signals $\mathbf{10}_a$, $\mathbf{10}_b$ and $\mathbf{10}_c$ are amplitude modulated (AM) or frequency modulated (FM), each of the RF signals $\mathbf{10}_a$, $\mathbf{10}_b$ and $\mathbf{10}_c$ exhibits a different nominal magnitude represented by the relative height of the vertical lines and a different carrier frequency represented by the relative position of the vertical lines. The nominal magnitude of each of the RF signals $\mathbf{10}_a$, $\mathbf{10}_b$ and $\mathbf{10}_c$ is primarily determined by the assigned broadcasting power of the transmitting station and the distance between the transmitting station and the radio receiver. The carrier frequency of each of the RF signals $\mathbf{10}_a$, $\mathbf{10}_b$ and $\mathbf{10}_c$ is primarily determined by the assigned carrier frequency of the transmitting station.

Due to the inherent amplification limitations of the radio receiver, only those of the RF signals $\mathbf{10}_a$, $\mathbf{10}_b$ and $\mathbf{10}_c$ having a nominal magnitude in excess of a minimum reception level 12 will produce satisfactory reception results. Therefore, it is desirable to tune the reception frequency of the radio receiver to receive only the RF signals $\mathbf{10}_a$ and $\mathbf{10}_b$ which have a nominal magnitude in excess of the minimum reception level 12. Since the RF signal $\mathbf{10}_c$ does not have a nominal magnitude in excess of the minimum reception level 12, it is desirable not to receive the RF signal $\mathbf{10}_c$. Further, in order to optimize reception of the RF signals $\mathbf{10}_a$ and $\mathbf{10}_b$, it is desirable to tune the reception frequency of the radio receiver to precisely the carrier frequency of each of the RF signals $\mathbf{10}_a$ and $\mathbf{10}_b$. The signal-seeking superheterodyne radio receiver shown in FIG. 1 fully accomplishes these desired objectives.

Figure 3:
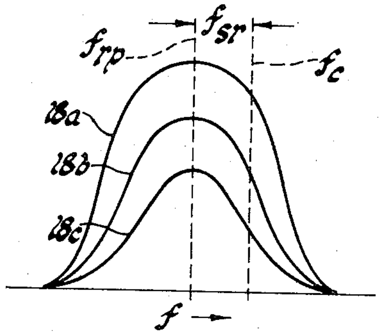
Figure 4:
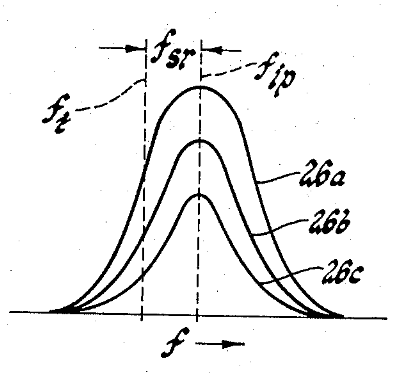

Referring particularly to FIG. 1, an antenna 14 is disposed for receiving RF signals. An RF stage 16 is connected to the antenna 14 for amplifying a received RF signal. As illustrated in FIG. 3, the RF stage 16 exhibits RF response curves $\mathbf{18}_a$, $\mathbf{18}_b$ and $\mathbf{18}_c$ having different overall magnitudes corresponding to the different nominal magnitudes of the RF signals $\mathbf{10}_a$, $\mathbf{10}_b$ and $\mathbf{10}_c$. The RF response curves $\mathbf{18}_a$, $\mathbf{18}_b$ and $\mathbf{18}_c$ are centered about a variable reception frequency or RF peak frequency $f_{rp}$. An oscillator stage 20 produces an oscillator signal having an oscillator frequency. A mixer stage 22 is connected to the RF stage 16 and the oscillator stage 20 for heterodyning the received RF signal with the oscillator signal to obtain an IF signal. An IF stage 24 is connected to the mixer stage 22 for amplifying the IF signal. As shown in FIG. 4, the IF stage 24 exhibits IF response curves $\mathbf{26}_a$, $\mathbf{26}_b$ and $\mathbf{26}_c$ having different overall magnitudes corresponding to the different nominal magnitudes of the RF signals $\mathbf{10}_a$, $\mathbf{10}_b$ and $\mathbf{10}_c$. The IF response curves $\mathbf{26}_a$, $\mathbf{26}_b$ and $\mathbf{26}_c$ are centered about a fixed IF peak frequency $f_{ip}$. It is to be noted that the oscillator stage 20 and the mixer stage 22 are often considered together to comprise a converter stage.

The previously described stages of a superheterodyne radio receiver are provided in both AM radio receivers and FM radio receivers. In fact, this portion of a superheterodyne radio receiver may be considered simply as an IF signal generator. The IF signal is amplitude modulated or frequency modulated in the same manner as the received RF signal so that the IF signal contains the same audio information carried by the received RF signal. In either case, the nominal amplitude of the IF signal is proportional to the nominal magnitude of the received RF signal. Further, the carrier frequency of the IF signal is equal to the difference between the carrier frequency of the received RF signal and the oscillator frequency of the oscillator signal. However, the oscillator frequency differs from the RF peak frequency by an amount equal to the IF peak frequency. Accordingly, the carrier frequency of the IF signal differs from the IF peak frequency by an amount equal to the amount by which the RF peak frequency differs from the carrier frequency of the received RF signal. Or, put another way, the carrier frequency of the IF signal is proportional to the difference between the reception frequency of the radio receiver and the carrier frequency of the received RF signal.

Referring again to FIG. 1, an automatic signal-seeking tuner 28 includes a drive mechanism 30 coupled with the RF stage 16 and with the oscillator stage 20 for determining the RF peak frequency and the oscillator frequency as a function of the position of the drive mechanism 30. The drive mechanism 30 may be mechanically coupled with the tuning elements of the RF stage 16 and the oscillator stage 20 as with a capacitive rotor plate tuner or an inductive slug tuner, or the drive mechanism 30 may be electrically coupled with the tuning elements of the RF stage 16 and the oscillator stage 20 as with a varactor diode tuner.

In any event, the tuner 28 is responsive to the application of a start signal to initiate movement of the drive mechanism 30 to vary the RF peak frequency of the RF stage 16 and to correspondingly vary the oscillator frequency of the oscillator stage 20. Preferably, the tuning direction is from the lower frequency to a higher frequency as shown in FIG. 3. Further, the tuner 28 is responsive to the application of a stop signal to terminate movement of the drive mechanism 30, but not until after the drive mechanism 30 has coasted to a stop over a stopping frequency range which is primarily determined by the inertia or momentum of the drive mechanism 30. As an example, the tuner 28, including the drive mechanism 30, may be provided as disclosed in U.S. Pat. No 2,751,503 to Schwarz. However, it is to be noted that the tuner 28 may be virtually any tuner having a stopping frequency range for which compensation must be made. An exaggerated stopping frequency range $f_{sr}$ for the drive mechanism 30 is shown in FIGS. 3 and 4.

Since the radio receiver provides maximum amplification when the RF peak frequency equals the carrier frequency of the received RF signal, it is desirable to stop the drive mechanism 30 at a position corresponding to an RF peak frequency equal to the carrier frequency of the received RF signal. Accordingly, referring to FIG. 3, it is desirable to apply a stop signal to the tuner 28 when the RF peak frequency $f_{rp}$ defined by the drive mechanism 30 differs from the carrier frequency $f_c$ of the received RF signal by an amount equal to the stopping frequency range $f_{sr}$. Alternately, referring to FIG. 4, it is desirable to apply a stop signal to the tuner 28 when the carrier frequency of the IF signal equals a fixed IF trigger frequency $f_t$ which differs from the IF peak frequency $f_{ip}$ by an amount approximately equal to the stopping frequency range $f_{sr}$. In either case, the drive mechanism 30 of the tuner 28 will coast to a stop at a position corresponding to a reception frequency or RF peak frequency which is equal to the carrier frequency of the received RF signal. Circuitry will now be described for accomplishing the desired result in conjunction with the circuitry previously described.

Figure 5A:
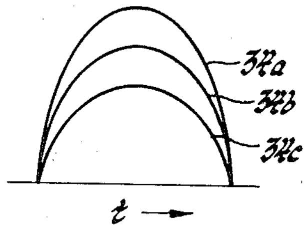
Figure 5B:
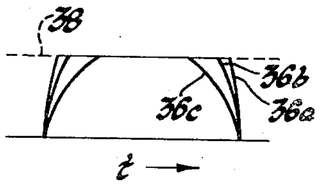

A limiter circuit 32 is connected to the IF stage 24 for clipping the amplitude of the IF signal at a limiting level to obtain an IF limited signal. The slope of the limited signal is a function of the amplitude of the IF signal. The frequency of the limited signal equals the frequency of the IF signal. This may be best understood by referring to FIG. 5. FIG. 5*a* shows a half-wave portion of several IF signals $\mathbf{34}_a$, $\mathbf{34}_b$ and $\mathbf{34}_c$ having a common frequency and having different amplitudes corresponding to the different magnitudes of the RF signals $\mathbf{10}_a$, $\mathbf{10}_b$ and $\mathbf{10}_c$. FIG. 5*b* shows a half-wave portion of several limited signals $\mathbf{36}_a$, $\mathbf{36}_b$ and $\mathbf{36}_c$ representing the IF signals $\mathbf{34}_a$, $\mathbf{34}_b$, and $\mathbf{34}_c$ clipped by the limiter circuit 32 at a limiting level 38. It will be noted that the overall slope of the IF limited signals $\mathbf{36}_a$, $\mathbf{36}_b$ and $\mathbf{36}_c$ is a nonlinear function of the amplitude of the corresponding IF signals $\mathbf{34}_a$, $\mathbf{34}_b$ and $\mathbf{34}_c$. That is, the rate of increase in the slope of the IF limited signals $\mathbf{36}_a$, $\mathbf{36}_b$ and $\mathbf{36}_c$ decreases as the amplitude of the IF signals $\mathbf{34}_a$, $\mathbf{34}_b$ and $\mathbf{34}_c$ increases. The significance of this characteristic will become more fully apparent later.

A control circuit 40 is connected to the limiter circuit 32. The control circuit 40 includes a transformer 42 having a primary winding 44 and a secondary winding 46. The transformer includes a pair of movable cores for varying the inductance of the primary and secondary windings 44 and 46. The taps to the primary and secondary windings 44 and 46 may be selected so as to optimize the impedance matching characteristics of the transformer 42. The primary winding 44 is coupled to the limiter circuit 32 for receiving the IF limited signal. An IF control signal is induced in the secondary winding 46 in response to application of the limited signal to the primary winding 44. The amplitude of the IF control signal is proportional to the overall slope of the limited signal in accordance with the well-known transformer relationship. The frequency of the control signal equals the frequency of the limited signal. The control circuit 40 further includes a pair of capacitors 48 and 50. The capacitor 48 is connected across the primary winding 44 of the transformer 42 to form a primary tuned circuit 52. The capacitor 50 is connected across the secondary winding 46 of the transformer 42 to form a secondary tuned circuit 54. The inductance of the primary and secondary windings 44 and 46 is adjusted by moving the cores of the transformer 42 so that the resonant frequency of the primary tuned circuit 52 and the resonant frequency of the secondary tuned circuit 54 are slightly different. Preferably, the resonant frequency of the primary tuned circuit 52 is set equal to the IF peak frequency while the resonant frequency of the secondary tuned circuit 54 is set slightly above the IF peak frequency. The significance of these characteristics will become more fully apparent later.

Figure 6:
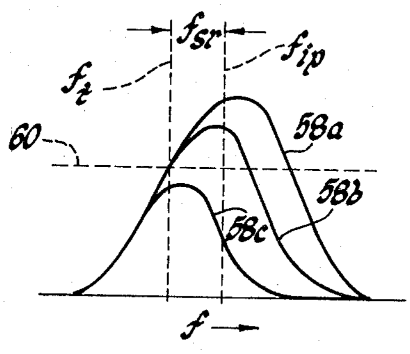

As illustrated in FIG. 6, the control circuit 40 exhibits IF response curves $\mathbf{58}_a$, $\mathbf{58}_b$ and $\mathbf{58}_c$ having different overall magnitudes corresponding to the different nominal magnitudes of the RF signals $\mathbf{10}_a$, $\mathbf{10}_b$ and $\mathbf{10}_c$. In other words, the different magnitudes of the IF response curves $\mathbf{58}_a$, $\mathbf{58}_b$ and $\mathbf{58}_c$ are produced by limited signals having different overall slopes derived from IF signals having different amplitudes corresponding to the different nominal magnitudes of the RF signals $\mathbf{10}_a$, $\mathbf{10}_b$ and $\mathbf{10}_c$. It will be noted that the rate of increase in the magnitude of the IF response curves $\mathbf{58}_a$, $\mathbf{58}_b$ and $\mathbf{58}_c$ decreases as the nominal magnitude of the RF signals $\mathbf{10}_a$, $\mathbf{10}_b$ and $\mathbf{10}_c$ increases. Hence, the IF response curves $\mathbf{58}_a$, $\mathbf{58}_b$ and $\mathbf{58}_c$ are effectively compressed with respect to magnitude. That is, as the nominal magnitude of the RF signals $\mathbf{10}_a$, $\mathbf{10}_b$ and $\mathbf{10}_c$ increases, the corresponding IF response curves $\mathbf{58}_a$, $\mathbf{58}_b$ and $\mathbf{58}_c$ tend to approach each other in magnitude. This compressing of the IF response curves $\mathbf{58}_a$, $\mathbf{58}_b$ and $\mathbf{58}_c$ is caused by the decrease in the rate of increase in the overall slope of the limited signals as the amplitude of the IF signals increases. Moreover, it will be noted that the IF response curves $\mathbf{58}_a$, $\mathbf{58}_b$ and $\mathbf{58}_c$ are effectively skewed with respect to peak frequency. This skewing of the IF response curves $\mathbf{58}_a$, $\mathbf{58}_b$ and $\mathbf{58}_c$ is caused by the difference in the resonant frequencies of the primary and secondary tuned circuits 52 and 54. Thus, the limiter circuit 32 and the control circuit 40 combine to effectively form a trigger stage for compressing and skewing the IF frequency response curves $58_a$, $58_b$ and $58_c$.

Referring again to FIG. 6, it will be observed that the IF response curves $58_a$ and $58_b$ each exceed a trigger level 60 at approximately a common point corresponding to the IF trigger frequency $f_t$ which differs from the IF peak frequency $f_{ip}$ by an amount approximately equal to the stopping frequency range $f_{sr}$ of the tuner drive mechanism 30. In addition, it will be observed that the IF response curve $58_c$ does not exceed the trigger level 60. Therefore, since the IF response curves $58_a$, $58_b$ and $58_c$ correspond to the RF signals $10_a$, $10_b$ and $10_c$, it is apparent that the IF control signal exceeds the trigger level 60 only when the nominal magnitude of the received RF signal exceeds the minimum reception level 12. Further, it is known that the IF trigger frequency $f_t$ is produced only when the reception frequency or RF peak frequency $f_{rp}$ of the radio receiver differs from the carrier frequency $f_c$ of the received RF signal by an amount equal to the stopping frequency range $f_{sr}$ of the tuner drive mechanism 30. Consequently, it is apparent that the IF control signal exceeds the trigger level 60 only when the reception frequency or RF peak frequency of the radio receiver differs from the carrier frequency of the received RF signal by an amount approximately equal to the stopping frequency range of the tuner drive mechanism 30 irrespective of the nominal magnitude of the received RF signal as long as it exceeds the minimum reception level 12. It will now be readily appreciated that these relationships provide extremely useful parameters for controlling the operation of the tuner 28.

Referring again to FIG. 1, a tuning initiation circuit 62 is connected with the tuner 28 for applying a start signal to the tuner 28 in response to manual actuation of a control element 64. Conversely, a tuning termination circuit 66 is connected between the control circuit 40 and the tuner 28 for applying a stop signal to the tuner 28 when the amplitude of the control signal exceeds the trigger level 60. The tuning termination circuit 66 is connected to the secondary winding 46 of the transformer 42 for receiving the control signal. The tuning termination circuit 66 may be provided by any suitable threshold detector circuit such as a diode detector in combination with a transistor biased to the trigger level 60.

Accordingly, each time the control element 64 is manually actuated, a start signal is applied to the tuner 28 by the tuning initiation circuit 62 to initiate movement of the drive mechanism 30 so as to vary the reception frequency or RF peak frequency of the radio receiver over the reception frequency spectrum. A stop signal is applied to the tuner 28 by the tuning termination circuit 66 when the IF control signal exceeds the trigger level 60. This occurs when the drive mechanism 30 reaches a position corresponding to an RF peak frequency which differs from the carrier frequency of the received RF signal by an amount approximately equal to the stopping frequency range of the drive mechanism 30. Consequently, the drive mechanism 30 coasts to a stop at a position corresponding to a reception frequency or RF peak frequency equal to the carrier frequency of the next received RF signal having a nominal magnitude above the minimum reception level 12. Hence, the radio receiver is automatically tuned to the carrier frequency of those RF signals over the reception frequency spectrum having a nominal magnitude in excess of the minimum reception level 12.

As applied to an AM radio receiver, the output of the IF stage 24 is connected to the AM detector stage and the remaining portions of the radio receiver. However, as applied to an FM radio receiver, the limiter circuit 32 may be utilized to remove amplitude modulation from the IF signal in addition to its use as part of the invention. Therefore, as applied to an FM radio receiver, the output of the limiter circuit 32 is connected to the FM detector and the remaining portions of the radio receiver. Thus, it will now be apparent that the invention provides a signal-seeking tuner which is readily adapted for application to both AM and FM radio receivers.

It is to be understood that the preferred embodiment of the invention disclosed herein is shown for illustrative purposes only and that various alterations and modifications may be made thereto without departing from the spirit and scope of the invention.

What is claimed is:

1. In a superheterodyne radio receiver for receiving RF signals each having a nominal amplitude in excess of a minimum reception level and each having a carrier frequency within a given reception band, the combination comprising: input means for receiving RF signals at a reception frequency; tuner means connected to the input means for varying the reception frequency in a particular tuning direction over the reception band, the tuner means responsive to the application of a start signal to initiate variation of the reception frequency and responsive to the application of a stop signal to terminate variation of the reception frequency, the tuner means exhibiting an inertia such that the reception frequency of the input means is varied over a stopping frequency range after the application of the stop signal; heterodyne means for producing an IF signal having a nominal amplitude determined by the nominal amplitude of each received RF signal and having a carrier frequency determined by the difference between the reception frequency of the input means and the carrier frequency of each received RF signal as the reception frequency of the input means is varied in the tuning direction toward the carrier frequency of the received RF signal; trigger means connected to the heterodyne means for producing different IF response curves each corresponding to a different amplitude of the IF signal the trigger means including amplitude responsive means for compressing the IF response curves with respect to overall magnitude and including frequency-responsive means for skewing the IF response curves with respect to peak frequency in the tuning direction, the compressed and skewed IF response curves constraining the amplitude of the IF signal to exceed a trigger level only if the nominal amplitude of the IF signal corresponds to a received RF signal having a nominal amplitude in excess of the minimum reception level and only when the carrier frequency of the IF signal corresponds to a received RF signal having a carrier frequency which differs from the reception frequency of the input means by an amount approximately equal to the stopping frequency range of the tuner means; tuning initiation means connected with the tuner means for applying a start signal to the tuner means when manually activated; and tuning termination means connected between the trigger means and the tuner means for applying a stop signal to the tuner means when the amplitude of the IF signal exceeds the trigger level; whereby the reception frequency of the input means is tunable to the carrier frequency of each received RF signal within the reception band having a nominal amplitude in excess of the minimum reception level.

2. In a superheterodyne radio receiver for receiving RF signals each having a nominal amplitude in excess of a minimum reception level and each having a carrier frequency within a given reception band, the combination comprising: an RF stage having an RF response exhibiting an RF peak frequency for receiving RF signals; tuner means connected with the RF stage for varying the RF peak frequency in a particular tuning direction over the reception band, the tuner means responsive to the application of a start signal to initiate variation of the RF peak frequency and responsive to the application of a stop signal to terminate variation of the RF peak frequency, the tuner means having an inertia such that the RF peak frequency of the RF stage is varied over a stopping frequency range after the application of a stop signal; an IF stage having an IF response curve exhibiting an IF peak frequency for processing IF signals; a converter stage connected between the RF stage and the IF stage for producing an IF signal having a nominal amplitude proportional to the nominal amplitude of each received RF signal and having a carrier frequency differing from the IF peak frequency by an amount equal to the amount by which the RF peak frequency differs from the carrier frequency of each received RF signal so that the carrier frequency of the IF signal approaches the IF peak frequency in the tuning direction as the RF peak frequency approaches the carrier frequency of the received RF signal in the tuning direction; and trigger means for providing different IF response curves each corresponding to a different amplitude of the IF signal, the trigger means including a limiter for clipping the amplitude of the IF signal to produce an IF limited signal, and a pair of inductively coupled LC tank circuits responsive to the introduction of the IF limited signal into one of the tank circuits having a resonant frequency approximately equal to the IF peak frequency to develop an IF control signal in the other of the tank circuits having a resonant frequency slightly offset from the IF peak frequency in the tuning direction, the combination of the limiter and the LC tank circuits compressing the IF response curves with respect to overall magnitude and skewing the IF response curves with respect to peak frequency thereby to constrain the amplitude of the IF control signal to exceed a trigger level only if the nominal amplitude of the IF signal corresponds to a received RF signal having a nominal amplitude in excess of the minimum reception level and only when the frequency of the IF signal corresponds to a received RF signal having a carrier frequency which differs from the RF peak frequency by an amount approximately equal to the stopping frequency range; tuning initiation means connected with the tuner means for applying a start signal to the tuner means when manually activated; and tuning termination means connected between the trigger means and the tuner means for applying a stop signal to the tuner means when the amplitude of the IF control signal exceeds the trigger level, whereby the RF peak frequency is tunable to the carrier frequency of each received RF signal within the reception band having a nominal amplitude in excess of the minimum reception level.

3. In a superheterodyne radio receiver for receiving RF signals each having a carrier frequency within a given reception band and each having a nominal amplitude in excess of a minimum reception level, the combination comprising: an RF stage having an RF response curve centered about an RF peak frequency for receiving an RF signal; tuner means connected with the RF stage and including a drive mechanism for defining the RF peak frequency of the RF stage as a function of the position of the drive mechanism so that the RF peak frequency is varied across the reception band in a particular tuning direction in response to movement of the drive mechanism, the tuner means responsive to the application of a start signal to initiate movement of the drive mechanism to begin variation of the RF peak frequency and responsive to the application of a stop signal to terminate movement of the drive mechanism to end variation of the RF peak frequency, the RF peak frequency varying over an additional stopping frequency range after the application of the stop signal to the tuner means as the drive mechanism gradually coasts to a stop due to the inherent inertia of the drive mechanism; an IF stage having an IF response curve centered about an IF peak frequency for processing IF signals; a converter stage connected between the RF stage and the IF stage for producing an IF signal having a nominal amplitude proportional to the nominal amplitude of each received RF signal and having a carrier frequency differing from the IF peak frequency by an amount equal to the amount by which the RF peak frequency differs from the carrier frequency of each received RF signal so that the carrier frequency of the IF signal approaches the IF peak frequency in the tuning direction as the RF peak frequency approaches the carrier frequency of the received RF signal in the tuning direction; and trigger means for providing different IF response curves each corresponding to a different amplitude of the IF signal, the trigger means including a limiter for clipping the amplitude of the IF signal to provide an IF limited signal, a transformer for developing an IF control signal in a secondary winding in response to the application of the IF limited signal to a primary winding, the combination of the limiter and the transformer acting to compress the IF response curves with respect to overall magnitude, and a pair of capacitors each connected across a different one of the primary and secondary windings to form a primary tuned circuit having a resonant frequency equal to the IF peak frequency and a secondary tuned circuit having a resonant frequency slightly offset from the IF peak frequency in the tuning direction, the combination of the transformer and the pair of capacitors acting to skew the IF response curves with respect to peak frequency, the compressed and skewed IF response curves constraining the amplitude of the IF control signal to exceed a trigger level only if the nominal amplitude IF signal corresponds to a received RF signal having a nominal amplitude in excess of the minimum reception level and only when the carrier frequency of the IF signal corresponds to a received RF signal having a carrier frequency which differs from the RF peak frequency by an amount equal to the stopping frequency range of the drive mechanism; tuning initiation means connected with the tuner means for applying a start signal to the tuner means when manually activated; and tuning termination means connected between the control means and the tuner means for applying a stop signal to the tuner means when the amplitude of the IF control signal exceeds the trigger level; whereby the drive mechanism of the tuner means coasts to a stop at a position corresponding to the carrier frequency of each received RF signal within the reception band having a nominal magnitude in excess of the minimum reception level.

* * * * *